H. G. GINACA.
CUTTING TUBE FOR FRUIT TREATING MACHINES.
APPLICATION FILED NOV. 14, 1912.

1,060,750.

Patented May 6, 1913.

Witnesses

Inventor
Henry G. Ginaca
By
Attorneys

UNITED STATES PATENT OFFICE.

HENRY GABRIEL GINACA, OF HONOLULU, TERRITORY OF HAWAII, ASSIGNOR TO HAWAIIAN PINEAPPLE COMPANY, LTD., OF HONOLULU, TERRITORY OF HAWAII, A CORPORATION OF THE TERRITORY OF HAWAII.

CUTTING-TUBE FOR FRUIT-TREATING MACHINES.

1,060,750.  Specification of Letters Patent.  Patented May 6, 1913.

Application filed November 14, 1912. Serial No. 731,377.

*To all whom it may concern:*

Be it known that I, HENRY GABRIEL GINACA, a citizen of the United States, residing at Honolulu, in the county of Honolulu, Territory of Hawaii, have invented certain new and useful Improvements in Cutting-Tubes for Fruit-Treating Machines; and I do hereby declare the following to be a full, clear, and exact description of the invention, such as will enable others skilled in the art to which it appertains to make and use the same.

This invention relates to the cutting tubes of machines for treating fruit such as pineapples, and particularly to improvements in the cutting ends of such tubes as are used for sizing fruit of the type described in U. S. Patent No. 1,006,621, issued Oct. 24, 1911 to Lewis E. Arnold. These sizing tubes have V-shaped projecting knives at the cutting end, such that the tube may be forced through the fruit, or the fruit forced through the tube, without revolving either the tube or the fruit, as the knives cut the fruit with a shearing cut. When pineapples are fed to the machines with the crown partly removed and with some leaves attached to the stem end, these leaves, which are often very dry and tough, are not always cut by the V-shaped knives of the sizing tube, but are torn from the stem and are crowded into the crotches between adjacent knives, or into the slots between adjacent knives or their cutting edges, with the result that said leaves are dragged along with or are pulled by the sizing tube when the latter is forced through the fruit, thus causing longitudinal grooves or indentations to be made in the outer surface of the sized fruit. This is not only true of the fruit from which the leaves were torn, but of fruit subsequently treated, as the leaves accumulate in the crotches or slots and aggravate the trouble.

The object of the present invention is to prevent this disfiguration of the sized fruit. I accomplish this object by making openings in the cutting tube rearward of the crotches or slots, and by rounding the rear edges of the tube at said openings, and by making longitudinal grooves on the outer surface of the tube rearward from said openings, as will hereinafter more fully appear.

Figure 1:
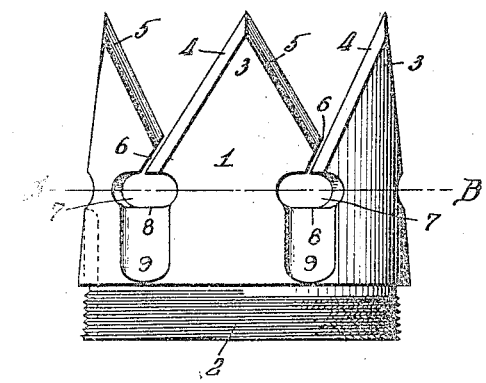
Figure 2:
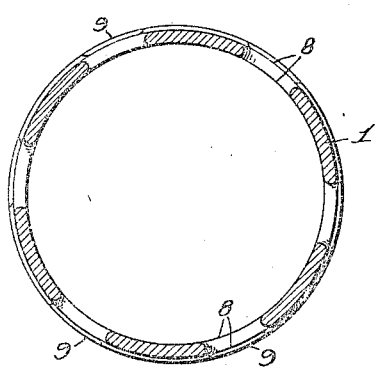

In the accompanying drawings, forming a part of this specification, Figure 1 represents a side view of the cutting end of a sizing tube embodying a preferred form of my invention. Fig. 2 is a section on the line A—B of Fig. 1.

Referring to the drawings, the cutting tube 1 is preferably threaded at its rear end 2, so as to be removably screwed into the remainder of the sizing tube, for the purpose of easy removal for sharpening or renewal. V-shaped knives 3 are formed on the cutting end of the tube 1, one cutting edge 4 of each knife 3 being made longer than the cutting edge 5 on the opposite side of the V. A slot 6 is made between the cutting edges 4 and 5 of adjacent knives 3. The cutting tube as far as thus described is the same as in the Arnold Patent referred to above.

A hole 7 is made through the tube 1 rearward of each cutting edge 4 and connecting with each slot 6, and the rear edges 8 of the tube 1 around the hole 7 are preferably rounded, as shown. Longitudinal grooves 9 are cut in the outer surface of the tube 1 from the holes 7 rearward.

In operation, when the tube engages the rear end of a fruit and the cutting edges 4 and 5 fail to cut a leaf, that portion of this leaf outside of the cutting edge is pushed rearward by the outer portion of the fruit and is laid back upon the outer surface of the tube. As the fruit continues to move rearward with respect to the tube, the fold or bend in the leaf passing through the slot 6 soon engages the rounded edges 8, instead of being pinched and bunched with other leaves in the slot as heretofore. The friction of a leaf between the fruit and the inside of the tube is practically equal to that between the outer portion of the fruit and the outside of the tube. That portion of the leaf within the tube, however, has the advantage that it is fastened to the stem of the fruit, and it also has the advantage of adhesive friction in passing over the rounded lower end of the fruit within the tube. The portion of the leaf outside of the tube is therefore pulled or drawn forward over the rounded edges 8 and into the tube, as the fruit moves rearward with respect to the tube. The object in rounding the edges of the tube 1 at the rear of the hole *i* is to reduce the resistance offered to the leaf in being pulled or drawn over same. The leaf being thin and flattened out and moving with the fruit within the tube does not injure or disfigure the sized fruit. The object of the grooves 9 is to so increase the space between the tube and the outer portion of the fruit that the friction may be reduced when the portion of the leaf outside of the tube is pulled and drawn forward over the tube.

I claim:

1. A cutting tube provided with knives at its cutting end disposed to form a crotch between the same, said tube having an opening therein rearward of and connected by a slot to the crotch between said knives.

2. A cutting tube provided with knives at its cutting end disposed to form a crotch between the same, said tube having an opening therein rearward of and connected by a slot to the crotch between the knives, the edges of the tube at the rear of said opening being rounded.

3. A cutting tube provided with knives at its cutting end disposed to form a crotch between the same, said tube having an opening therein rearward of the crotch between the knives, and having a slot between the knives connected to said opening, and said tube provided with a longitudinal groove rearward from said opening.

4. A cutting tube provided with V-shaped knives at its cutting end, one edge of each knife being longer than the adjacent edge of the next knife, said tube having an opening therein rearward of each of the longer cutting edges, the latter terminating in said opening.

5. A cutting tube provided with V-shaped knives at its cutting end, one edge of each knife being longer than the adjacent edge of the next knife, said tube having an opening therein rearward of each of the longer cutting edges with the latter terminating in said opening, and the rear edges of the tube at said opening being rounded.

6. A cutting tube provided with V-shaped knives at its cutting end, one edge of each knife being longer than the adjacent edge of the next knife, said tube having a slot between said edges, and having an opening rearward of and connected to said slot, and said tube provided with longitudinal grooves rearward from said opening.

7. A cutting tube provided with V-shaped knives at the cutting end, one edge of each knife extending rearward and laterally with respect to the adjacent cutting edge of the next knife, and said tube having an opening therein rearward of each of the longer cutting edges with the latter terminating in said opening.

8. A cutting tube provided with V-shaped knives at the cutting end, one edge of each knife extending rearward and laterally with respect to the adjacent cutting edge of the next knife, said tube having an opening therein rearward of each of the longer cutting edges and the latter ending in the opening and the rear edges of the tube rounded in said opening.

9. A cutting tube provided with V-shaped knives at the cutting end, one edge of each knife extending rearward and laterally with respect to the adjacent cutting edge of the next knife, said tube having an opening therein rearward of each of the longer cutting edges, the latter terminating in the openings, and said tube having a longitudinal groove rearward from each of said openings in the outer surface of the tube.

10. A cutting tube having projecting knives at the cutting end, with opposite edges disposed at an angle to each other, one edge of each knife extending rearward and laterally with respect to the adjacent edge of the adjacent knife and separated therefrom by a slot, and said tube having an opening therein rearward of and connected to each slot.

11. A cutting tube having projecting knives at the cutting end, with opposite edges disposed at an angle to each other, one edge of each knife extending rearward and laterally with respect to the adjacent edge of the adjacent knife and separated therefrom by a slot, and said tube having an opening therein rearward of each slot, the edges of the tube at the rear of each of said openings being rounded.

12. A cutting tube, projecting knives at the cutting end, with opposite edges disposed at an angle to each other, one edge of each knife extending rearward and laterally with respect to the adjacent edge of the adjacent knife and separated therefrom by a slot, said tube having an opening therein rearward of each slot, and said tube provided with a longitudinal groove rearward from each opening.

In testimony whereof I affix my signature, in presence of two witnesses.

HENRY GABRIEL GINACA.

Witnesses:
 ROBT. J. PRATT,
 ARTHUR F. EWART.